United States Patent
Nishida et al.

[11] Patent Number: 6,124,910
[45] Date of Patent: Sep. 26, 2000

[54] ACTIVE MATRIX LIQUID CRYSTAL DISPLAY DEVICE WITH PLURAL BLACK MATRIX PIXELS OPENINGS

[75] Inventors: Shinichi Nishida; Tsutomu Kadotani; Shunsuke Shiga, all of Tokyo, Japan

[73] Assignee: NEC Corporation, Tokyo, Japan

[21] Appl. No.: 09/317,270

[22] Filed: May 24, 1999

[30] Foreign Application Priority Data

Jun. 19, 1998 [JP] Japan .................................. 10-173182

[51] Int. Cl.[7] ................................................ G02F 1/1333
[52] U.S. Cl. ........................................ 349/110; 349/111
[58] Field of Search ...................................... 349/111, 110

[56] References Cited

U.S. PATENT DOCUMENTS

| | | | |
|---|---|---|---|
| 5,781,261 | 7/1998 | Ohta et al. | 349/111 |
| 5,786,876 | 7/1998 | Ota et al. | 349/111 |
| 5,831,701 | 11/1998 | Matsuyama et al. | 349/111 |

FOREIGN PATENT DOCUMENTS

10-319436  12/1998  Japan .

*Primary Examiner*—James A. Dudek
*Attorney, Agent, or Firm*—Young & Thompson

[57] ABSTRACT

An active matrix-type liquid crystal display device driven by a transverse electric field is provided which is capable of providing a superior image quality without showing after images or uneven images by maintaining the potential of the black matrix at an optimum value, while maintaining the black matrix in a floating state; the active matrix-type liquid crystal display device being constructed by a pair of transparent insulating substrates, and on the TFT substrate, a plurality of scanning lines and a plurality of signal lines, thin film transistors formed near the crossover points of the scanning and signal lines, pixel electrodes connected to the TFTs, and counter electrodes formed facing to the pixel electrodes are formed with a transverse electric field being generated by applying a voltage between the pixel electrodes and the counter electrodes, and a slit with a predetermined size being formed in the black matrix formed on the other CF substrate.

13 Claims, 10 Drawing Sheets

ACTIVE MATRIX LIQUID CRYSTAL DISPLAY DEVICE WITH PLURAL BLACK MATRIX PIXELS OPENINGS

BACKGROUND OF THE INVENTION

1. Field of the Invention

The present invention relates to a liquid crystal display device, and more particularly relates to an active matrix liquid crystal display device driven by a transverse electric field driving method.

This application is based on Patent Application No. Hei 10-173182 filed in Japan, the contents of which are incorporated herein by reference.

2. Background Art

An active matrix-type liquid crystal display device (hereinafter, abbreviated as AMLCD), which uses thin film field effect-type transistors as switching elements of the pixels, is widely used, due to its high image quality, as a display device for portable computers or as monitors for small size desk-top computers.

Recently, a method of display using a transverse electric field has been proposed for improving the angle-of-visibility characteristics for the purpose of realizing a higher image quality. This method is disclosed in Japanese Patent Application, First Publication No. Hei 5-505247, which controls the quantity of transmitted light by changing the direction of the anisotropic axis (director) of the liquid crystal by applying a voltage between the pixel electrodes and counter electrodes formed in parallel to each other on the first substrate on which TFTs (thin film transistors) are formed.

In this method of driving the liquid crystal display device, since the director rotates on the substrate surface when the voltage is applied between the pixel electrode and the counter electrode, good images are obtained over a wide viewing angle, in contrast to the twisted nematic method, wherein, the problem arises that due to rising of the director from the substrate, the relationship between the quantity of the transmitted light and the applied voltage shows a large change depending upon the viewing angle such as a viewing angle from a direction of the director or a viewing angle from the direction normal to the substrate.

Figure 5:
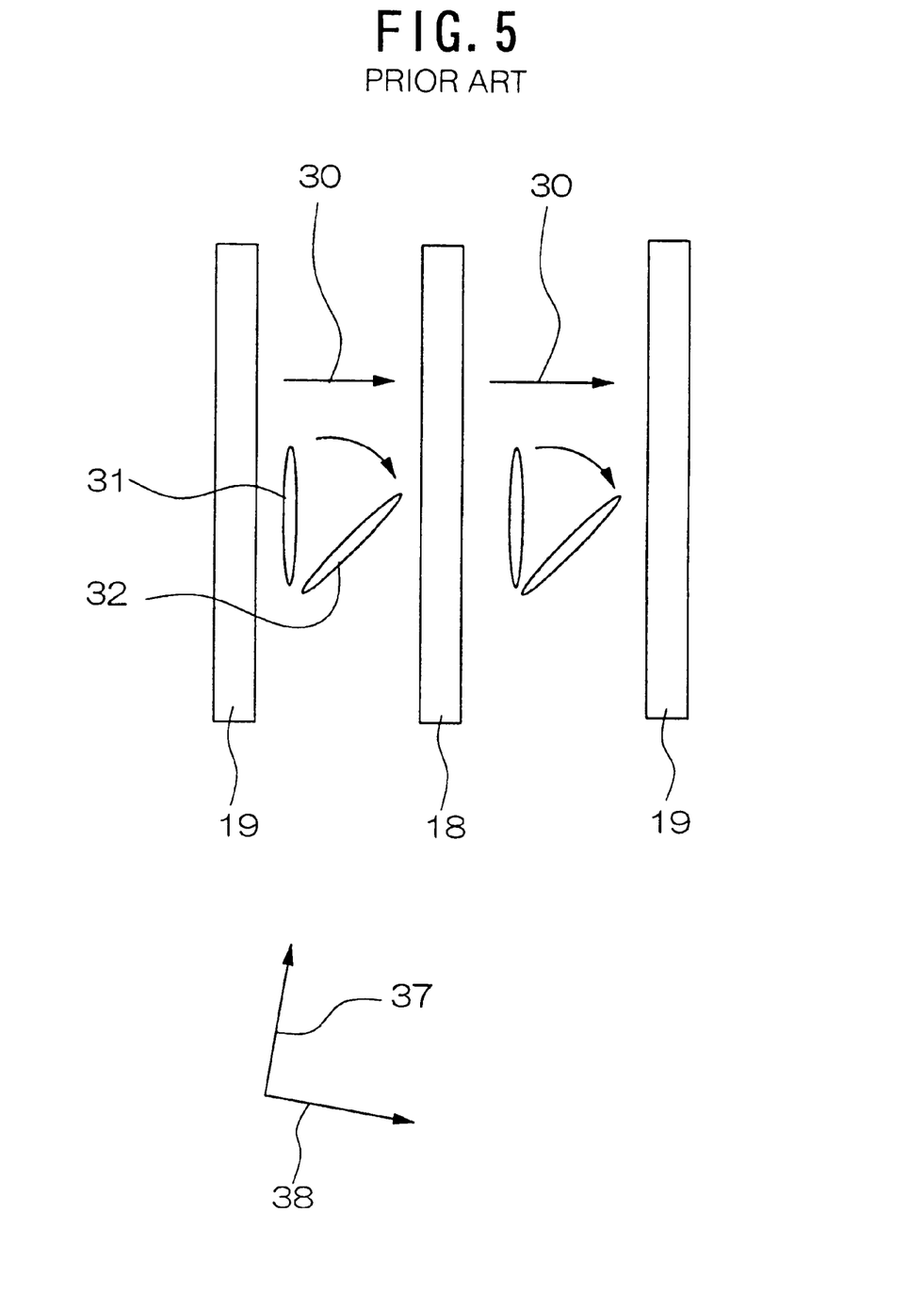
FIG. 5 is a diagram for explaining a principle of the in-plane switching mode.
Figure 6A:
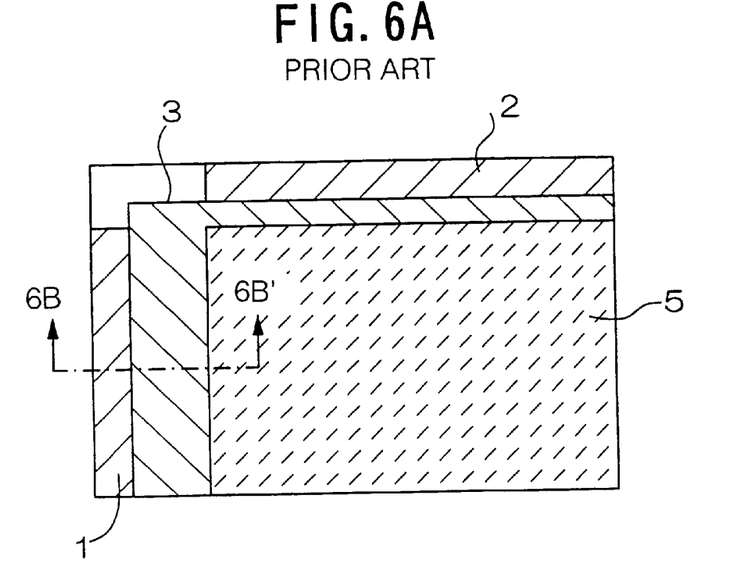
FIG. 6A shows a plan view of a conventional liquid crystal panel.
Figure 6B:
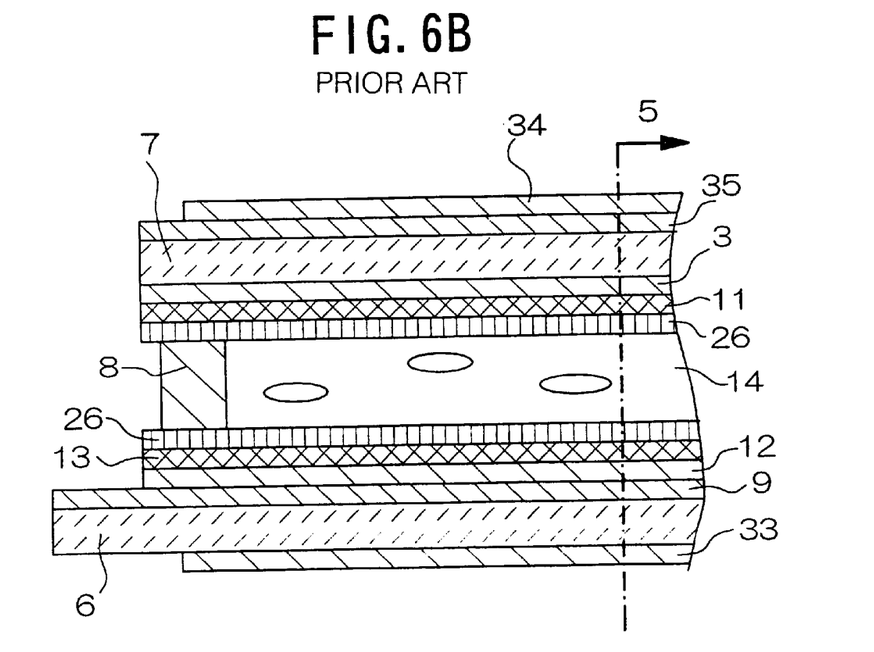
FIG. 6B shows a cross sectional view along the 6B–6B' line of the conventional liquid crystal panel of FIG. 6A around the extended scanning lines in an conventional example.

The method shown in FIG. 5 is widely used, since it is possible to maintain the black color at a reduced brightness, in which method the liquid crystal layer is arranged in a homogeneous orientation, and is inserted between two polarizing plates, the angles of polarization of which are orthogonal to each other, and one of the polarization angles is made identical with the orientation of the liquid crystal, and the display color is made black when no voltage is applied, and the display color turns white, by twisting the liquid crystal into the direction of the electric field when applying a voltage.

In this liquid crystal driving mode, since the electric field is applied in the transverse direction, there is no transparent electrode at the liquid crystal side of the second substrate which faces the first substrate on which TFTs are formed. Therefore, color layers of the color filters on the second substrate (hereinafter, abbreviated as CF substrate), and a black matrix (hereinafter, abbreviated as BM) are not shielded electrically. Accordingly, the charge distribution inside the color filter is changed by the voltage applied to the liquid crystal, whereby the electric field is disturbed. Such disturbance causes cross-talk and after images, which results in deteriorating the image quality of the display device. Particularly, when the BM potential differs from the potential of the counter electrode, the electric charge near the BM migrates to the display opening portion, which causes after images.

A measure to prevent this electric charge migration is proposed in Japanese Patent Application, First Publication No. Hei 9-269504, in which a BM made of a conductive material is fixed at the same potential as that of the counter electrode by connecting the BM to the TFT substrate.

Although a method of increasing the resistance of the BM is proposed, to obtain a panel without having uneven indications, in Japanese Patent Application, First Publication No. Hei 9-43589, the method is not sufficient to solve the above problem by itself.

Furthermore, another method is proposed for a TN-type liquid crystal panel to float the transparent electrode formed, facing the liquid crystal, on the second substrate, in Japanese Patent Application, First Publication No. Hei 9-263021. However, this method is not a direct solution of the above problem, because it is related to a liquid crystal panel driven by applying an electric field in the transverse direction and floating is applied to the BM, which is not directly related to the formation of the electric field of the display opening.

Another method is proposed in the Domestic Re-publication of PCT International Publication No. WO95/25291, in which a sealed electrode is formed on the second substrate, and a fixed potential is applied to the sealed electrode to give the sealed electrode the role of the BM. In addition to the above structure, a method is proposed to provide a slit in the sealed electrode in order to prevent a delay in the signal caused by capacitive coupling between the sealed electrode at a fixed potential and signal lines. However, the above method does not constitute a substantial solution to the above problem, since the above method uses a BM in a floating condition and, in order to provide an area which overlaps with electrodes on the active matrix substrate for the purpose of bringing the potential of the black matrix near to that of the counter electrode, the slit is formed only on a part of the black matrix, which overlaps with the scanning lines.

In general, in the liquid crystal display device using a transverse electric field, an overcoat layer is formed on the color layer to prevent the diffusion of impurities from the color layer to the liquid crystal layer. In order to supply a potential from the TFT substrate to the BM, it is necessary to expose the BM by removing the overcoat layer around peripheral area, which causes the problem that an increased number of production processes is required. Additionally, it is necessary to reduce the resistance of the BM in order to suppress fluctuation of the BM potential caused by fluctuations of the signal line potentials, since the BM is capacitively coupled with many signal lines, so that the problem arises that the range of materials for forming the BM is restricted when the BM is applied to a large area.

Thus, a method to fix the potential of the BM is not advantageous, from the point of view of manufacturing an active matrix-type liquid crystal display panel at a reduced cost. However, as described above, if the BM is floated, the BM potential fluctuates as a result of the potential fluctuation on the TFT substrate, which seriously affects the image quality, irrespective of the resistance of the BM.

Immediately after starting display of the liquid crystal panel, the potential of each point on the BM coincides with that of the electrodes which overlap on the TFT substrate. That is, the potential of the BM adjacent to an area, where the extended signal lines are densely disposed, is identical to an off-potential of the scanning lines Vgoff, and the BM potential at the display pixel portion becomes the average of the potentials of the scanning lines, the counter electrode, and the pixel electrodes.

As described above, since the BM potentials differs depending upon the location, an electric current flows between the extended scanning lines and the display pixels through the BM to make the BM potential homogeneous. During such current flow, the BM potential, in a region of a few millimeters from the side where the extended scanning lines are arranged, becomes lower than the potential of the counter electrode. At this time, since a strong transverse electric field is generated from the BM edge to the columns at both edges of a pixel, the liquid crystal will be subjected to the twist-deformation at the columns, so that the area glitters during displaying the black. If the resistance of the BM is sufficiently low, BM potential is homogenized almost spontaneously, this local glittering is not observed. However, when the resistance of the BM is high, the phenomenon of the local glittering in the black color is observed at the side where the extended scanning lines are arranged, after the displaying has been operated for a while.

The BM potential of the display portion is lower than that of the counter electrode due to the influence of the scanning lines which are subjected to a large negative bias. Such a potential difference between the BM and the counter electrode causes migration of electric charge from the BM to the pixel display region. Such migration of electric charge is remarkable when the resistance of BM is lower. Therefore, the problem arises that the BM with a low resistance is likely to cause after images of short duration.

The objects of the present invention are to provide an active matrix-type liquid crystal display device which is capable of maintaining the BM potential at an appropriate value, while maintaining the BM in a floating condition, and obtaining an excellent image quality which does not include after image or unevenness.

SUMMARY OF THE INVENTION

According to the first aspect of the present invention, the present invention provides an active matrix-type liquid crystal display device comprising a pair of insulating transparent substrates, in which the first substrate comprises a plurality of scanning lines and a plurality of signal lines, thin film transistors mounted near the crossover points of said scanning lines and said signal lines, pixel electrodes connected to the respective thin film transistors, counter electrodes facing said pixel electrodes; and the second substrate comprises a black matrix having openings at the regions facing said pixel electrodes; and the liquid crystal layer interposed between those two substrates is controlled by an electric field generated in an approximately parallel direction to the liquid crystal layer by a voltage applied between said pixel electrodes and said counter electrodes;

wherein, an opening with a predetermined area is formed in at least a part of the black matrix facing said scanning lines or the signal lines.

According to the second embodiment, the present invention provides an active matrix-type liquid crystal display device comprising a pair of insulating transparent substrates, in which the first substrate comprises a plurality of scanning lines and a plurality of signal lines, thin film transistors mounted near the crossover points of said scanning lines and said signal lines, pixel electrodes connected to respective thin film transistors, counter electrodes facing said pixel electrodes; and the second substrate comprises a black matrix having openings at regions facing said pixel electrodes; and the liquid crystal layer interposed between those two substrates is controlled by an electric field generated in approximately parallel direction to the liquid crystal layer by a voltage applied between said pixel electrodes and said counter electrodes;

wherein, a slit with a predetermined area is formed at least at a part of regions of the black matrix formed on the second substrate facing each pixel electrode.

According to the third aspect of the present invention, the present invention provides an active matrix-type liquid crystal display device according to the first aspect, wherein, considering a unit pixel, and when it is assumed that Sg represents an area in which the black matrix overlaps with the region of the scanning lines not covered by signal electrodes, Sd represents an area in which the black matrix overlaps with the region of signal lines not covered by the other electrode, Vgoff represents a potential of the scanning lines in a non-selection period, Vcom represents a potential supplied to the counter electrodes, Vs represents a temporal mean of the signal line potential, and ∈H and ∈P represent the dielectric constants of the liquid crystal in the director direction and in the direction perpendicular to the director, respectively, and said predetermined area is set so as to satisfy the following equation (1), $$\in H(Vgoff-Vcom)Sg+\in P(Vs-Vcom)Sd=0 \qquad (1)$$

According to the fourth aspect, the present invention provides an active matrix-type liquid crystal display device comprising a pair of insulating transparent substrates, in which the first substrate comprises a plurality of scanning lines and a plurality of signal lines, thin film transistors mounted near the crossover points of said scanning lines and said signal lines, pixel electrodes connected to the respective thin film transistors, counter electrodes facing said pixel electrodes; and the second substrate comprises a black matrix having openings at regions facing said pixel electrodes; and the liquid crystal layer interposed between those two substrates are controlled by an electric field generated in an approximately parallel direction to the liquid crystal layer by a voltage applied between said pixel electrodes and said counter electrodes;

wherein, the black matrix disposed on the second substrate extends to the outer periphery of the display region, a bus line maintained at the same potential as the counter electrode is formed in between the terminal deriving the signals from said signal lines and the display region along one side of the display region, and a slit is formed in the black matrix over the whole length of the side where the extended scanning lines are arranged.

According the fifth aspect, the present invention provides an active matrix-type liquid crystal display device according to the fourth aspect, wherein the bus line maintained at the same potential as the counter electrode is formed in between the terminal for deriving signals from said signal lines and a display region on the first substrate, the black matrix is formed in a whole range of side area where the extended scanning lines are arranged.

According to the sixth aspect, the present invention provides an active matrix-type liquid crystal display device in which said black matrix is formed by a resin composition having a volume resistivity of more than $10^6$ Ωcm.

BRIEF DESCRIPTION OF THE DRAWINGS

FIGS. 1A and 1B are schematic diagrams for explaining a first embodiment of the present invention.

FIGS. 4A and 4B are schematic diagrams for explaining the second embodiment of the present invention.

FIGS. 6A and 6B are diagrams showing a conventional examples.

FIGS. 11A and 11B are diagrams for explaining the third embodiment of the present invention.

DETAILED DESCRIPTION OF THE PREFERRED EMBODIMENTS

The active matrix-type liquid crystal display device according to the embodiments comprises two substrates facing each other, and one of the two substrates is a TFT substrate (FIG. 1B, 6) which comprises a plurality of scanning lines (FIG. 1B, 9) and a plurality of signal lines, thin film transistors formed adjacent to the crossover points of the scanning lines and the signal lines, pixel electrodes connected to the thin film transistors, counter electrodes formed so as to face the pixel electrodes. The active matrix liquid crystal display device, which generates an electric field approximately parallel to the liquid crystal layer by a voltage applied between the pixel electrode and the counter electrodes, comprises a slit (FIG. 1A, 4) in a portion of a region facing the scanning lines of a black matrix (FIG. 1A, 3), which is formed on a CF substrate.

Embodiments

In order to explain in more detail, the preferred embodiments will be hereinafter described with reference to the attached drawings.

[Embodiment 1]

Figure 1A:
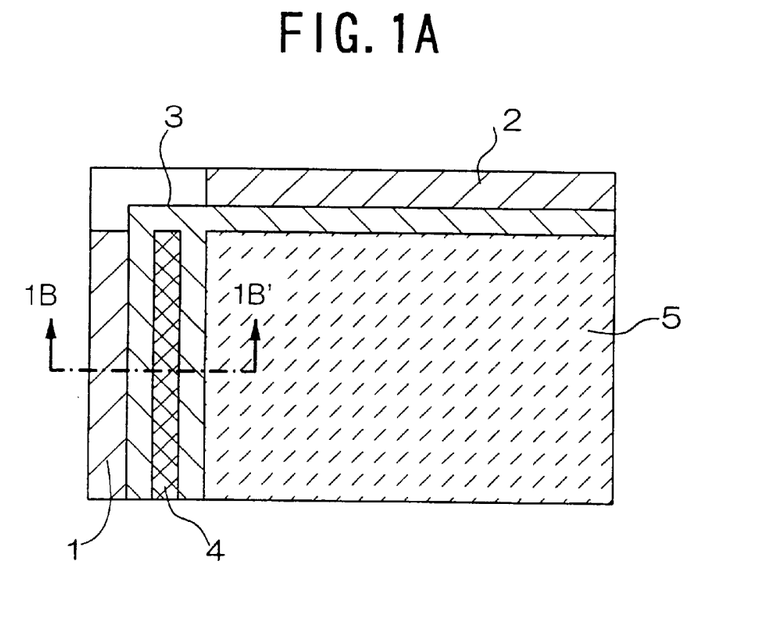
FIG. 1A is a plan view of a liquid crystal panel and FIG. 1B is a cross-sectional view along the 1B–1B' line of FIG. 1A.
Figure 1B:
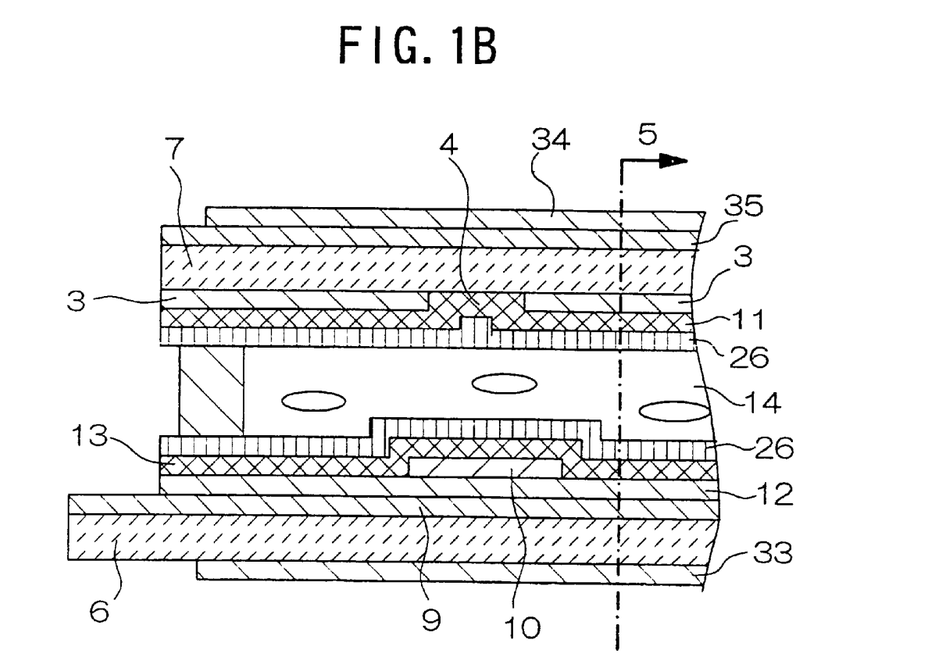
Figure 2:
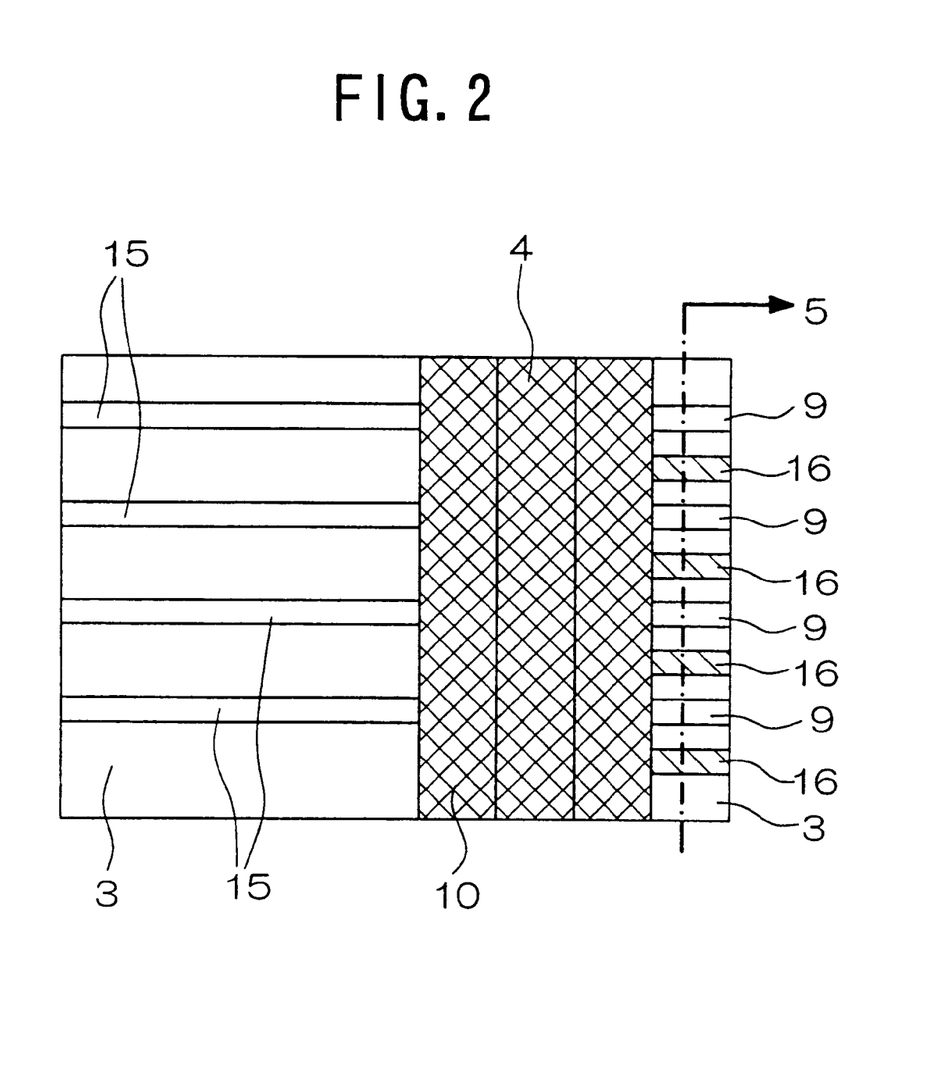
FIG. 2 shows an area adjacent to the extended scanning lines of the first embodiment of the present invention.
Figure 3:
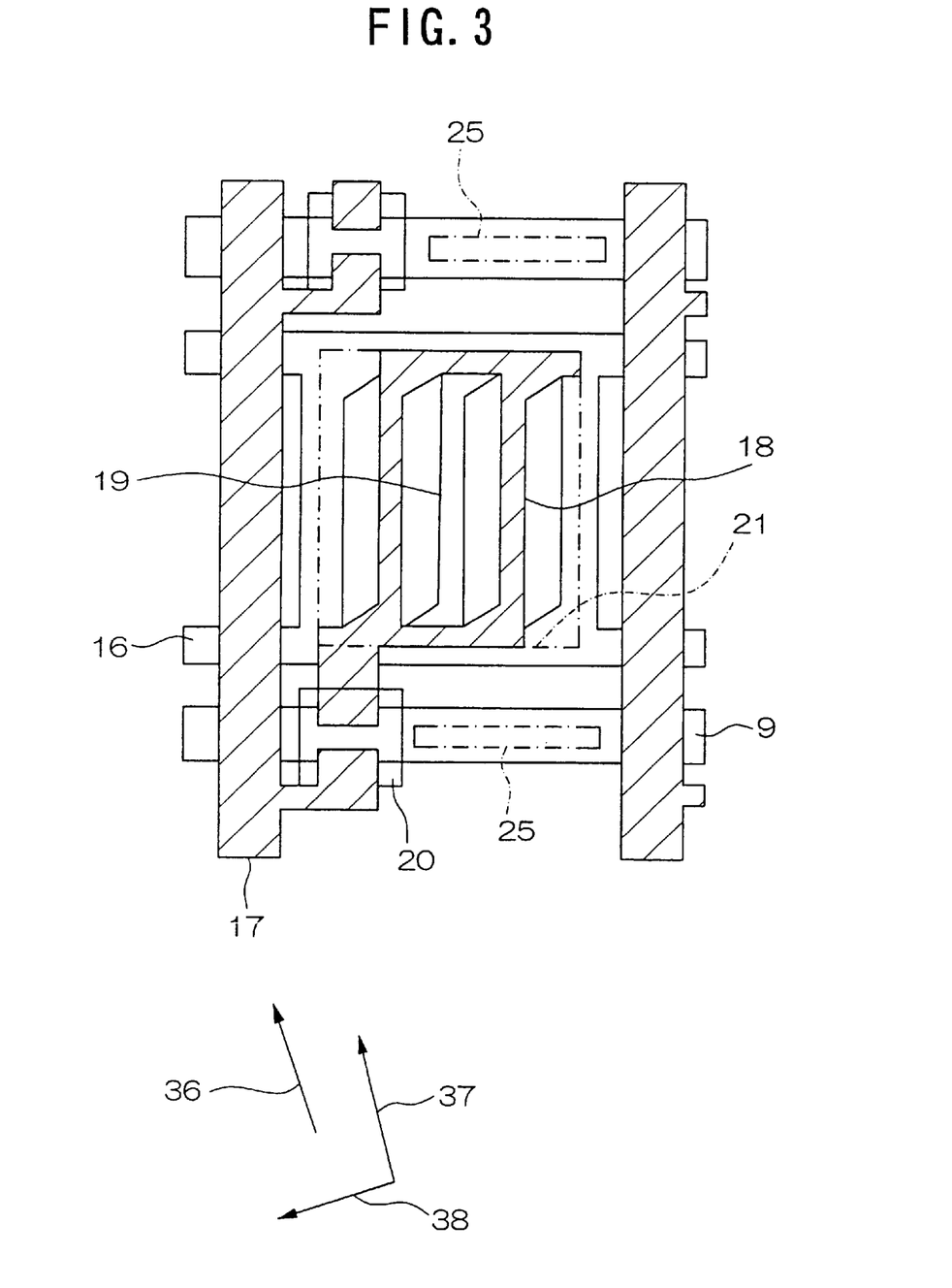
FIG. 3 is a diagram showing a plan view of one pixel according to the first embodiment of the present invention.

The first embodiment of the present invention is explained with reference to FIGS. 1 to 3. FIG. 1A shows an active matrix-type liquid crystal display device as a whole according to the first embodiment of the present invention, and FIG. 1B shows a cross-sectional view along 1B–1B' line of FIG. 1. FIG. 2 is an overview around the neighborhood of the extended scanning lines, and FIG. 3 is a plan view of a unit pixel of the display portion.

First, the manufacturing process of the active matrix-type liquid crystal display device according to this embodiment will be described. The TFT substrate is manufactured as follows. A chromium film is deposited on the TFT substrate at a thickness of 250 nm as a metal layer for forming scanning lines 9, counter electrode wiring 16, and counter electrode 19, and the chromium layer is patterned, that is, subjected to a patterning process. On the metal pattern, as a gate insulating film, a silicon nitride film 400 nm thick, an amorphous silicon film 300 nm thick, and an n-type amorphous silicon 30 nm thick are continuously deposited, and the amorphous silicon film and the n-type amorphous silicon film are subjected to a patterning process.

In a peripheral area, after forming a contact hole for connecting a bus-line 10 at the same potential as the counter electrode to the counter electrode wiring 16, a chromium film is deposited at a thickness of 250 nm for forming signal lines 17, pixel electrodes, and the bus line 10 at the same potential as the counter electrode, and is subjected to the patterning process. A silicon nitride film is deposited at a thickness of 200 nm as a passivation film 13 and the passivation film 13 is removed at the terminals 1 of the scanning lines and the terminals 2 of the signal lines. By the process described above, the TFT substrate is produced.

The CF substrate is manufactured as follows. On a transparent insulating substrate for the CF substrate, after depositing on the rear surface an ITO film at a thickness of 20 nm, a resin composition containing carbon particles is deposited on a front surface at a thickness of 1.3 $\mu$m. As shown in FIG. 3, opening patterns 21 and the slit 25 which is made in a region which overlaps with the scanning lines are formed and, in the peripheral area, a slit pattern 4 is formed. Thereby, the black matrix 3 is formed. The volume resistivity of the thus made black matrix was in a range of $10^9$ to $10^{11}$ $\Omega$cm.

The slit formed on the scanning lines has a dimensions of 6 $\mu$m in width, and 50 $\mu$m in length such that the equation (1) is satisfied for the designed driving conditions. The slit pattern 4 is provided at 100 $\mu$m in width over the whole length of the side where the extended scanning lines is arranged. The respective color layers R, G, and B are formed thereon at a thickness of 1.2 $\mu$m, and these color layers are subjected to the patterning process. An overcoat is formed at a thickness of about 1.0 $\mu$m, yielding the CF substrate.

On TFT substrate 6 and CF substrate 7, orientation films 26 are formed, and a rubbing treatment is performed for the TFT substrate in the direction of 36 in FIG. 3, which is 15 degrees to the longitudinal direction of the pixel electrodes, and, for the CF substrate, rubbing is performed in a direction, which is 180 degrees opposite to 36 of FIG. 3.

Subsequently, both TFT and CF substrates are adhered to each other after coating sealing materials and scattering spacers, and liquid crystal is injected and sealed in the adhered substrates. The cell gap of the liquid cell is set as 4.5 $\mu$m, and an anisotropy $\Delta$n of the refractive index of the liquid crystal is set as 0.007. Thereby, the color tone of the white display screen is improved. In addition, a liquid crystal with a specific resistance of more than $10^{14}$ $\Omega$cm is used. The liquid crystal is sandwiched by a pair of polarizing plates forming a cross-nicol. The polarization angle 37 of the polarizing plate on the CF plate is set parallel to the direction of the rubbing, and the polarization angle of the polarizing plate mounted on the TFT substrate is set perpendicular to the direction of rubbing.

Next, the construction of the active matrix-type liquid crystal display device will be explained. Referring to FIG. 1, the TFT side transparent insulating susbstrate 6 and the CF side transparent insulating substrate 7 are glued so as to coincide with respective two edges, and in the other two edges, the terminal 1 of the scanning lines and the terminal 2 of the signal lines are formed. The black matrix 3 formed on the TFT substrate extends to the edge of the substrate. In a space between the terminal 1 of the scanning lines and the terminal of the signal lines, a bus line 10 which is at the same potential as the counter electrode is formed along the side where the extended scanning lines are arranged. This bus line is formed so as to cover a part of the scanning lines through the gate insulating film 12, and, thereon, a passivation film 13 is formed.

Referring to FIG. 2, the entire area except the area forming the slit is covered by the BM 3. At the left side of the slit 4 in FIG. 2, the BM overlaps almost all of the scanning lines. In contrast, at the right side of the slit 4, the wiring 16 of the counter electrode connected with the bus lines 10, which have the same potential as the current electrode, extends toward the display portion 5 in parallel to the scanning electrodes 9 by the same metallic layer as the scanning electrode 9.

As described hereinbefore, BM overlaps with the wiring of the scanning electrode 9 and the wiring of the counter electrodes at a width of 100 µm before extending to the display area 5. Thus, in the right side of the slit 4, no part of the BM area is negatively biased on average. In the area facing the bus line on the CF substrate 7, the slit 4 of the BM is formed. On the BM layer, an overcoat layer 11 is formed in order to prevent impurities in the BM and the color layers from diffusing into the liquid crystal layer.

The orientation films 26 are formed on the TFT substrate 6 and the CF substrate 7, respectively, and the liquid crystal layer 14 is supported in a sealed space insulated by the sealing material 8. The orientation films are subjected to the rubbing treatment on one hand in a direction of 36 in FIG. 3, and on the other hand in the direction 180 degrees opposite to the direction of 36 in FIG. 3, so that the liquid crystal is homogeneously oriented in the parallel directions of the rubbing treatment. When it is assumed that the surface, on which the BM and the color layers are formed, is the front surface, the rear ITO 35 as a transparent conductive film is formed on the rear surface in order to prevent a disturbance of the display caused by the influence of the static electricity from the display surface.

Furthermore, two polarizing plates 33 and 34 forming a cross nicol are disposed so as to sandwich the liquid crystal layer. The orientation 37 of the polarizing axis of the polarizing plate on the CF substrate is set parallel to the rubbing direction, and the orientation 38 of the polarization axis of the polarizing plate is set perpendicular to the rubbing direction.

Referring to FIG. 3, the counter electrode 19 formed by the same metal layer as the scanning line 9 and connected to the counter electrode bus line 16 and the pixel electrode 18 formed by the same metal layer as the signal line 17 and connected to the source electrode of the thin film transistor extend in parallel to the signal line 17. Both edges of the pixel electrode 18 and the counter electrode 19 are connected to each other, and the connecting portions overlaps each other, sandwiching the gate insulating layer therebetween to form a pixel storage capacitance. Furthermore, the edges of both the pixel electrode 18 and the counter electrode 19 are formed in an obliquely cut shape. This shape is formed for preventing the edge from generating an electric field which twists the director of the liquid crystal in an opposite direction to the normal twisting.

Figure 8:
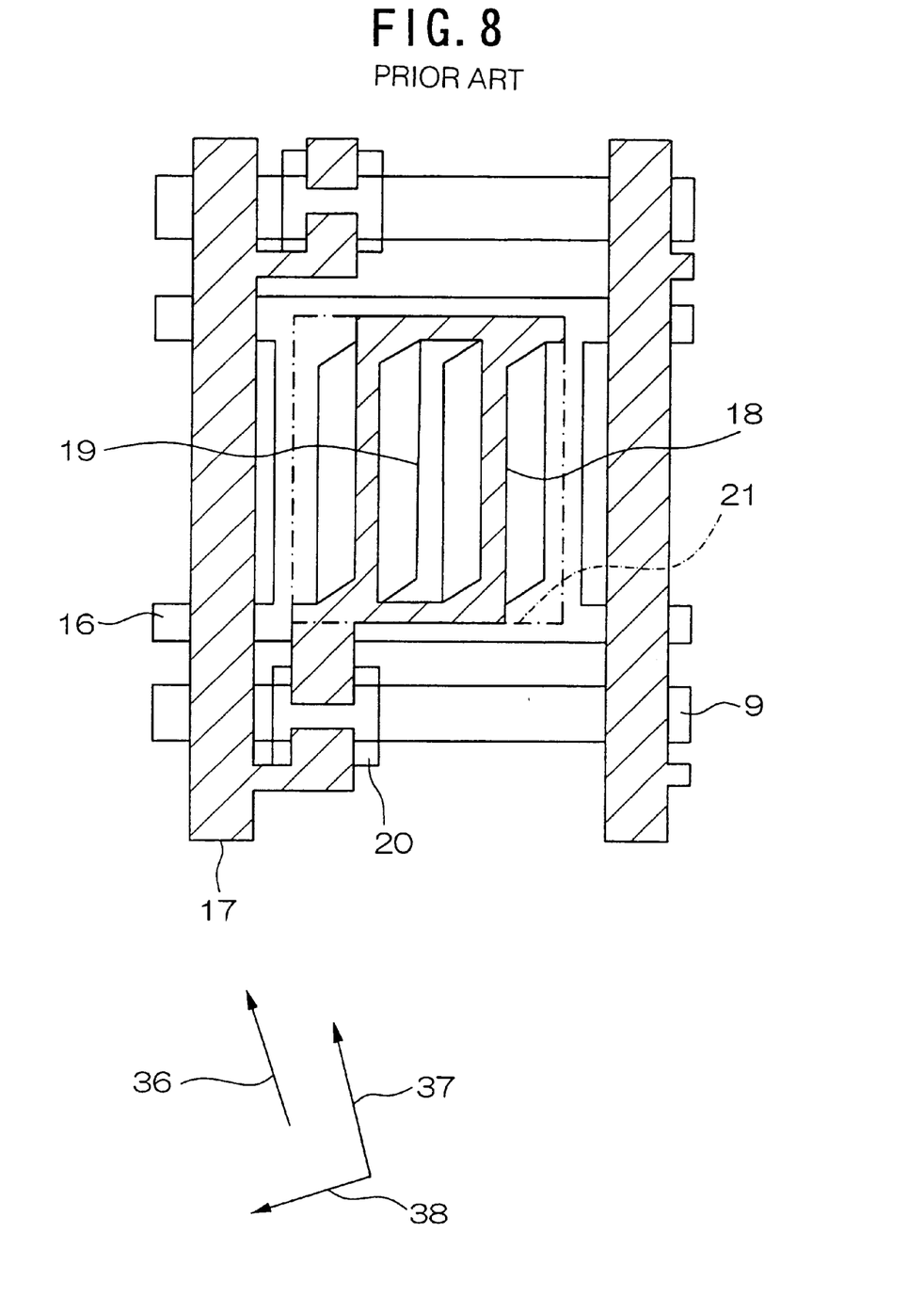
FIG. 8 shows a plan view of a pixel of the conventional example.

The IBM is removed, similar to the conventional example shown in FIG. 8, in a shape 21 so as to enclose the display area. If the BM is not removed at that area, since the scanning lines 9 overlaps with the BM over the whole area excluding the region covered by the source/drain electrodes of the TFT and islands of the amorphous silicon 20, a large capacitive coupling occurs between the BM and the scanning lines, which results in the BM being negatively biased and causing the problem of after images etc.

This problem will be analyzed in more detail by using mathematical equations. In order to explain the general character of the BM, it is divided into fine elements and provided that, on the TFT substrate, the area of the electrode facing each element i is Si, the potential is $Vi^{(TFT)}$, the potential of each element is $Vi^{(BM)}$, the average dielectric constant of the liquid crystal in the longitudinal direction is $\in i$, the thickness of the liquid crystal layer is d, and the amount of charge of each element is Qi. The relationship between the potential of each element of the BM and the amount of charge can be always expressed by the following equation.

$$Qi = (\in i \; Si/d) \times (Vi^{(BM)} - Vi^{(TFT)}) \quad (2)$$

The total charge Q of the BM defined by the equation (3) is a constant not depending on time, if the BM is completely insulated.

$$Q = \Sigma Qi \quad (3)$$

If the condition before starting the operation is the initial condition, since all elements are at an equal potential at the initial condition, the amount of charge of each element Qi=0. When operation of the liquid crystal panel starts, $Vi^{(TFT)}$ becomes a non-zero value. However, since the resistance of the BM is higher than that of the wiring of the TFTs, an electric current will not flow and Qi remains zero. Thus, this state is expressed by the following equation.

$$Vi(BM) = Vi(TFT) \quad (4)$$

After starting operation, the potential Vi of each point is different from the others, potential differences may occur between each BM element. Since the BM is conductive, a current flows due to potential differences in the BM network. Although $Vi^{(BM)}$ changes with the change of some Vi(TFT) values sensitive to high frequency, the current flowing in the BM does not follow these changes, and a current flows between the BM elements by an potential difference determined by the temporal average $<Vi^{(BM)}>$. Such current changes the Qi of each point, and finally, the temporal average $<Vi(BM)>$ of the BM potentials at every point reach a constant value $V^{(BM)}$. By calculating the temporal means of the equations (2) and (3), the $V^{(BM)}$ satisfies the following equation (5).

$$0 = <Q> = \Sigma <Qi> = \Sigma((\in i \; Si/di) \times (Vi^{(BM)} - Vi^{(TFT)})) \quad (5)$$

The above equation determines the BM potential after sufficient time passes and the temporal mean of every BM potential reaches a constant value.

Hereinafter, a problem will be explained for a conventional example of a liquid crystal panel which uses amorphous silicon thin film field effect-type transistors as switching elements and which is driven by twisting a homogeneous oriented nematic liquid crystal having a positive anisotropy of the dielectric constant by a transverse electric field.

Figure 7:
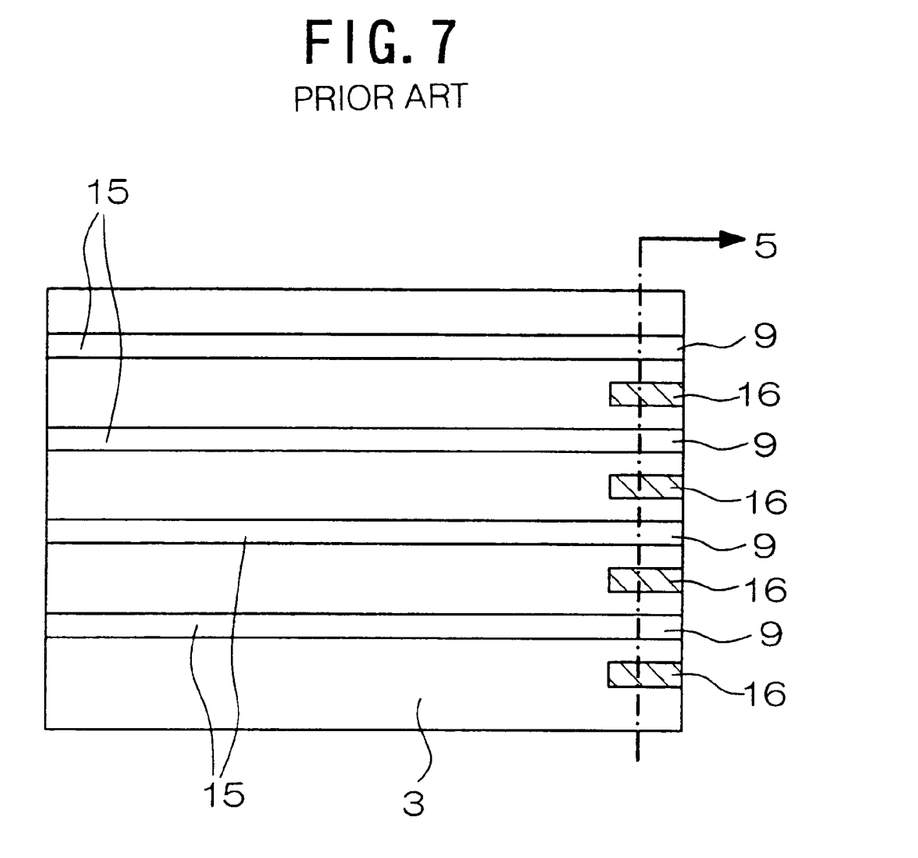
FIG. 7 is a diagram showing an area adjacent to the side where the extended scanning lines are arranged in the conventional example.

As shown in FIG. 7, in the outside of the display region along the side of the extended scanning lines, the BM only overlaps the extended scanning lines. The temporal mean of the BM potential in this area is given by the following equation.

$$\langle Vgout(BM)\rangle = Vgoff \qquad (6)$$

In contrast, the display portion comprises a plurality of pixels shown in FIG. 8. In each unit pixel, the BM overlaps with scanning line 9, signal line 17, and the counter electrode 19/pixel electrode 18. The potential of the BM is considered as divided elements. The potential of an element overlapping the scanning line 9 are Vgoff, which corresponds to the off potential of the scanning line, the potential of an element which overlaps the counter electrode/pixel electrode are the same as the average voltage of the signal lines, and the potentials of elements which overlap the counter electrode/pixel electrode are equal to the counter electrode potential Vcom.

These elements are in close proximity, and the potentials of these elements are equalized by rapid current flow, and the temporal mean of the BM potential in the display portion is given by the following equation.

$$V_p^{(BM)} = (\in_g Vgoff Sg + \in_d Vs Sd + \in_c Vcom Sc)/(\in_g Sg + \in_d Sd + \in_c Sc) \qquad (7)$$

where, $\in_g$, $\in_d$, and $\in_c$ are mean dielectric constants of respective elements in a vertical direction to the substrate. Sg, Sd, and Sc are the areas of the part of each element overlapping the scanning line, signal line, and the counter/pixel electrode, respectively.

Since $Vp^{(BM)}$ is close to Vcom, and the liquid crystal in the region overlapping the scanning line rises, to approximately $\in_g = \in H$, and the liquid crystal remains in the horizontal direction in a region overlapping the signal line or the pixel/counter electrodes, so that dielectric constants in various regions may be approximated as $\in_g = \in_c = \in p$.

As numerical examples, the values of $\in H/\in p=3$, Sd:Sc:Sg=5:5:1, Vcom=5.0 V, Vs=6.5 V, and Vgoff=−9V are assumed and substituted into the equations (6) and (7), and $\langle Vp^{(BM)}\rangle = 2.4$ V and $\langle Vgout^{(BM)}\rangle = -9V$ are obtained. As shown, right after the operation, the temporal mean potential at the portion where the extended scanning lines are arranged, differs from that at the display portion.

Figure 9:
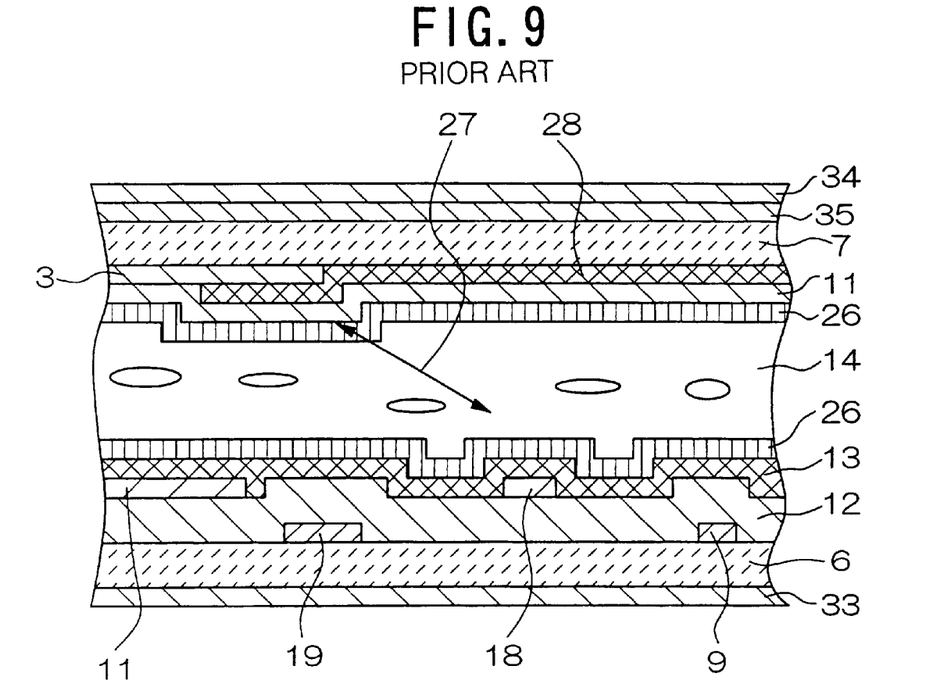
FIG. 9 is a diagram for explaining a problem which occurs when the BM potential is separated from that of the counter electrode in the conventional example.

A current flows through the BM by the potential difference for equalizing the BM potential, and thus, while such current flows, the BM potential becomes close to the potential of Vgout in a region which is a few millimeter apart from the side where the extended scanning lines are derived from the display portion. As a result, since a large potential difference is generated between the BM and the counter electrode and since a traverse electric field 27 is generated toward the columns of both edges of the pixel from BM edges, which causes the twisting deformation of the liquid crystal.

Figure 10:
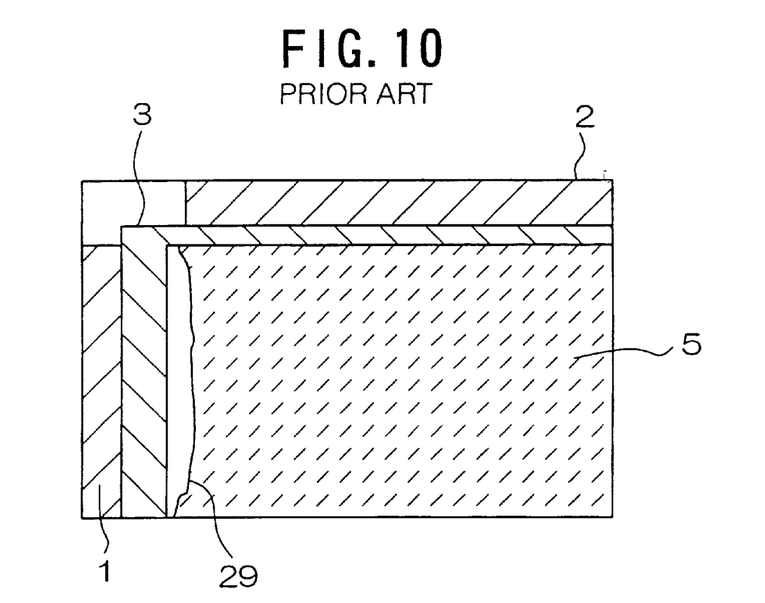
FIG. 10 is a diagram for explaining the display anomaly which occurs when the BM potential is separated from that of the counter electrode in the conventional example.

When the resistance of the BM is sufficiently low, the potential equalization occurs instantaneously, and no effect of the potential difference appears. However, if the BM resistance is high, shiny regions 29 appear in black display screen near the driving portion of the scanning lines in a short time after starting display. The period of time in which this display anomaly occurs varies depending upon the resistance of the BM, and when the volume resistivity is in the range of $10^6$ to $10^7$ Ωcm, the duration is about several minutes, and when the volume resistivity is $10^9$ to $10^{10}$ Ωcm, the shining lasts for several hours.

It is assumed that, in a unit pixel, Sg represents the area where the black matrix overlaps a region in which the scanning line is not covered by the other electrode, Sd represents the area where the black matrix overlaps a region in which the signal line is not covered by the other electrode, Vgoff represents the potential of the scanning line in an non-selection period, Vcom represents the potential to supply to the counter electrode, Vs represents a temporal mean of the signal line potential, $\in_H$ represents a dielectric constant of the liquid crystal in the direction of the director, and $\in p$ represents the dielectric constant of the liquid crystal in the direction perpendicular to the director. The size of the slit facing to the scanning line is determined so as to satisfy the relations expressed in the equation (1).

$$\in_H(Vgoff-Vcom)Sg + \in p(Vs-Vcom)Sd = 0 \qquad (1)$$

Thereby, the amount of negative bias from the counter electrode potential by the capacitive coupling of the BM with the scanning line can be balanced by an amount of positive bias from the counter electrode potential by the capacitive coupling of the BM with the signal line, so that the BM potential can be maintained at a potential close to the counter electrode potential. Consequently, a uniform image display without indicating any unevenness is realized which has an excellent image quality with no after image.

In this embodiment, a bus line 10 is formed adjacent to the display portion between the display portion and the terminal of the scanning lines, and, on the color filter substrate, a slit 4 is formed in the BM in a region facing to the bus line 10, extending over a whole length of the side where the extended scanning lines are arranged.

This slit 4 divides the BM region into two regions, one is the region where the scanning line deriving wires are congested and the other is the region of the display portion. Since no current flows between these two regions, a drastic potential fall does not occur near the area where the extended scanning lines are arranged, in contrast to the conventional example. Thus, the BM potential is maintained at $\langle Vp^{(BM)}\rangle$, so that the display anomaly will never appears. In addition, the back light will not go through the area where the slit 4 is present is sealed by the bus line 10 in the TFT substrate, so that a good contrast is given to the display.

In this embodiment, in order to increase the resistivity of the liquid crystal, a liquid crystal compound having a cyano group at a terminal end of the compound, or a liquid crystal compound having high polarity may be incorporated into the host liquid crystal. The resistivity of the thus mixed liquid crystal can be increased to the range of $10^{12}$ to $10^{13}$ Ωcm and by using such a liquid crystal, the liquid crystal display device exhibits a superior display with no after image and excellent reliability in high temperature operation.

In this embodiment, a resin composition containing carbon particles is used as a material for the BM. In order to reduce cross talk of the display, and to obtain a better display, it is preferable in view of equation (1), that the BM is formed by a resin composition, the resistivity of which is larger than $10^6$ Ωcm. Thus, it is possible to use a resin composition containing metal oxide particles as the BM material, which results in reducing the transparency of the BM and obtaining a better image quality.

[Second Embodiment]

Figure 4A:
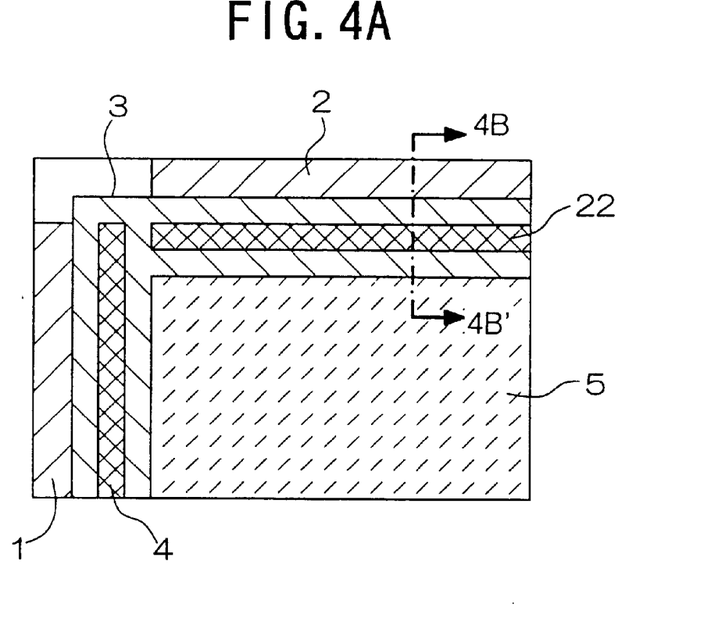
FIG. 4A shows a plan view of the liquid crystal panel and FIG. 4B shows a cross sectional view along the 4B–4B' line of the liquid crystal panel shown in FIG. 4A.
Figure 4B:
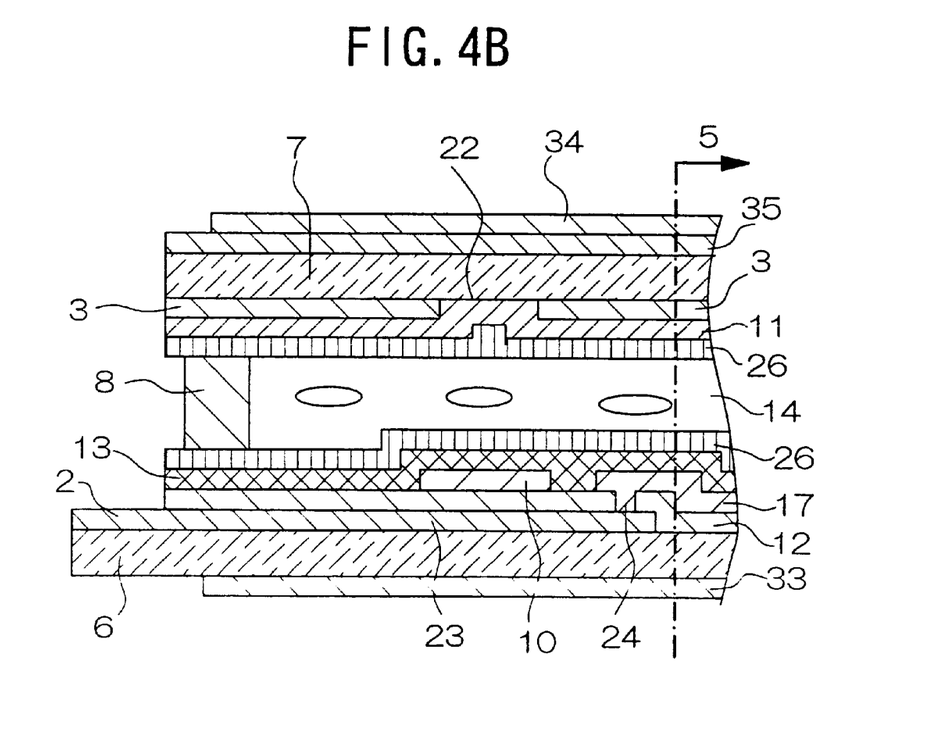

The second embodiment of the present invention will be explained with reference to FIG. 4. FIG. 4A shows an active matrix-type liquid crystal display device as a whole, and FIG. 4B shows a cross section along 4B–4B' line of FIG. 4B.

In the second embodiment, the signal lines 17 are connected through the contact hole 24 to the extended wiring 23 of the signal lines which is formed by the same metal layer as the signal line 9. On a part of the signal line extended wiring 23, a bus line 10, held at the same potential as that of the counter electrode formed in parallel to the side where the extended signal line are arranged, is formed on the gate insulating film covering the signal line extension wiring 23. On the bus line 10, a passivation film 13 is formed. The other features are the same as those of the first embodiment.

In the conventional example, since the average potential of the signal lines, even at the side where the extended signal lines are densely formed, is higher as much as the feed-through voltage than the counter electrode potential Vcom, the display anomaly may be caused when the feed-through voltage is high. However, in the present embodiment, as shown in FIG. 4, the display quality can be maintained at a high level, because the bus line 10, held at the same potential as that of the counter electrode, is formed in an adjacent region of the display portion near the side where the extended signal lines are arranged, and because, on the region facing that region on the color filter substrate 7, the BM slit is formed on the larger part of the side where the extended signal lines are arranged.

Therefore, the BM potential near the side where the extended signal lines are arranged can be controlled more accurately, which contributes to better display quality.

[Third Embodiment]

Figure 11A:
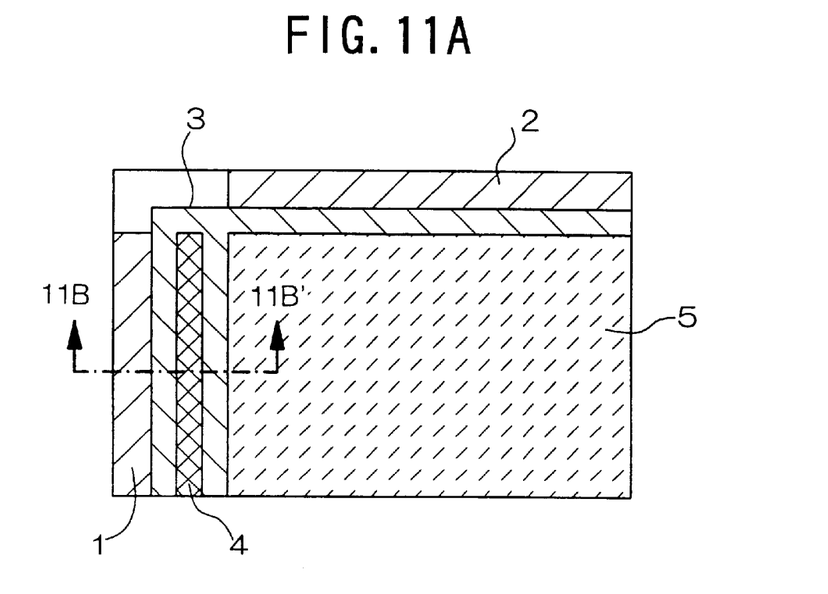
FIG. 11A is a plan view of the liquid crystal panel according to the third embodiment.
Figure 11B:
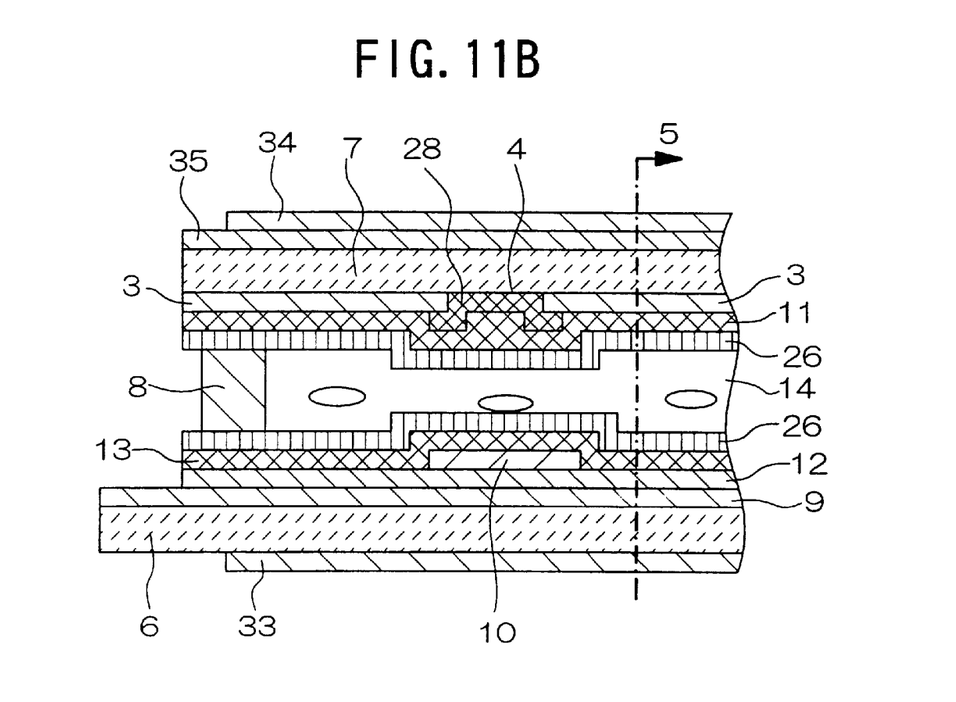
FIG. 11B is a plan view of a cross sectional view along the 11B–11B' line of the liquid crystal panel shown in FIG. 11A.

The third embodiment of the present invention is described hereinafter with reference to FIGS. 11A and 11B. FIG. 11A shows an liquid crystal display device as a whole in an active matrix liquid crystal display device according to the third embodiment of the present invention, and FIG. 11B shows the cross sectional view along the 11B–11B' line in FIG. 11A.

The third embodiment differs from the first embodiment only in that one of color layers of R, G, and B is formed so as to cover the BM slit 4 formed near the side where the extended scanning lines are arranged.

The structure of the third embodiment described above is able to control the reflected light through the slit formed in the vicinity of the scanning line deriving portion by the color layer 8, which further contributes to better image quality.

As explained above, the present invention contributes to obtaining an active matrix-type liquid crystal display device which exhibits a highly homogeneous display with no after images, and good display quality and a wide angle of visibility.

The above described excellent performance is obtained based on the structure of the active matrix-type liquid crystal display device of the present invention in that it comprises a bus line at the same potential as the current electrode formed along the sides near the deriving wires of the signal lines or scanning lines, a slit formed on the black matrix facing the bus line, and a slit of the black matrix facing the scanning line in each pixel, so that it is possible to maintain the potential of the black matrix near the potential of the counter electrode while maintaining it in the floating state which facilitates control of the potential of the black matrix.

What is claimed is:

1. An active matrix-type liquid crystal display device comprising a pair of insulating transparent substrates, in which the first substrate comprises a plurality of scanning lines and a plurality of signal lines, thin film transistors mounted near the crossover points of said scanning lines and said signal lines, pixel electrodes connected to the respective thin film transistors, counter electrodes facing said pixel electrodes; the second substrate comprising a black matrix having first openings at regions facing said pixel electrodes; an interior region defined by the crossover points of said scanning lines and said signal lines; and the liquid crystal layer interposed between those two substrates is controlled by an electric field generated in an approximately parallel direction to the liquid crystal layer by a voltage applied between said pixel electrodes and said counter electrodes; and second openings with a predetermined area formed in at least a part of the black matrix in vertical alignment with said scanning lines or the signal lines.

2. An active matrix-type liquid crystal display device comprising a pair of insulating transparent substrates, in which the first substrate comprises a plurality of scanning lines and a plurality of signal lines, thin film transistors mounted near the crossover points of said scanning lines and said signal lines, pixel electrodes connected to the respective thin film transistors, counter electrodes facing said pixel electrodes; and the second substrate comprises a black matrix having first openings at regions facing said pixel electrodes; and the liquid crystal layer interposed between those two substrates is controlled by an electric field generated in an approximately parallel direction to the liquid crystal layer by a voltage applied between said pixel electrodes and said counter electrodes;

wherein, a slit with a predetermined area is formed in at least at a part of the regions of the black matrix formed on the second substrate facing each pixel electrode, said slit being located apart from said first openings.

3. An active matrix-type liquid crystal display device comprising a pair of insulating transparent substrates, in which the first substrate comprises a plurality of scanning lines and a plurality of signal lines, thin film transistors mounted near the crossover points of said scanning lines and said signal lines, pixel electrodes connected to the respective thin film transistors, counter electrodes facing said pixel electrodes; and the second substrate comprises a black matrix having openings at regions facing said pixel electrodes; and the liquid crystal layer interposed between those two substrates is controlled by an electric field generated in an approximately parallel direction to the liquid crystal layer by a voltage applied between said pixel electrodes and said counter electrodes;

wherein, an opening with a predetermined area is formed in at least a part of the black matrix facing said scanning lines or the signal lines wherein, considering a unit pixel, and when it is assumed that Sg represents an area in which the black matrix overlaps with the region of the scanning lines not covered by the other electrode, Sd represents an area in which the black matrix overlaps with the region of signal lines not covered by the other electrode, Vgoff represents a potential of the scanning lines at non-selection period, Vcom represents a potential supplied to the counter electrodes, Vs represents a temporal mean of the signal line potential, and $\in H$ and $\in P$ represents the dielectric constants of the liquid crystal in the director direction and in the direction perpendicular to the director, respectively, and said predetermined area is set so as to satisfy the following equation (1), $$\in H(Vgoff-Vcom)Sg+\in P(Vs-Vcom)Sd=0 \qquad (1).$$

4. An active matrix-type liquid crystal display device comprising a pair of insulating transparent substrates, in which the first substrate comprises a plurality of scanning lines and a plurality of signal lines, thin film transistors mounted near the crossover points of said scanning lines and said signal lines, pixel electrodes connected to the respective thin film transistors, counter electrodes facing said pixel electrodes; and the second substrate comprises a black matrix having openings at regions facing said pixel electrodes; and the liquid crystal layer interposed between those two substrates is controlled by an electric field generated in an approximately parallel direction to the liquid crystal layer by a voltage applied between said pixel electrodes and said counter electrodes;

wherein, the black matrix disposed on the second substrate extends to the outer periphery of the display region, a bus line maintained at the same potential as the counter electrode is formed in between the terminal of the signals from said signal lines and the display region along one side of the display region, and a slit is formed in the black matrix extending to the whole length of the side where the extended scanning lines are arranged.

5. An active matrix-type liquid crystal display device according to claim 4, wherein the bus line maintained at the same potential as the counter electrode is disposed along the side of the display portion in between the signal terminal of said signal lines and the display region on the first substrate, and the black matrix is formed over the whole length of the side where the extended scanning lines are arranged.

6. An active matrix-type liquid crystal display device according to claim 1, wherein said black matrix is formed by a resin composition.

7. An active matrix-type liquid crystal display device according to claim 6, wherein said black matrix has a volume resistivity of more than $10^6$ Ωcm.

8. An active matrix-type liquid crystal display device according to claim 4, wherein said black matrix is formed by a resin composition.

9. An active matrix-type liquid crystal display device according to claim 8, wherein said black matrix has a volume resistivity of more than $10^6$ Ωcm.

10. An active matrix-type liquid crystal display device according to claim 2, wherein said black matrix is formed by a resin composition.

11. An active matrix-type liquid crystal display device according to claim 10, wherein said black matrix has a volume resistivity of more than $10^6$ Ωcm.

12. The active matrix-type liquid crystal display of claim 7, wherein said black matrix has a volume resistivity in the range of $10^6$–$10^7$ Ωcm.

13. The active matrix-type liquid crystal display of claim 2, wherein said black matrix has a volume resistivity in the range of $10^6$–$10^7$ Ωcm.

* * * * *